May 4, 1937.  S. A. MURDOCK  2,079,223
SOUND MOTION PICTURE SYSTEM
Filed Oct. 4, 1935   2 Sheets-Sheet 1

Inventor
Sidney A. Murdock.
Attorney.

May 4, 1937.  S. A. MURDOCK  2,079,223
SOUND MOTION PICTURE SYSTEM
Filed Oct. 4, 1935  2 Sheets-Sheet 2
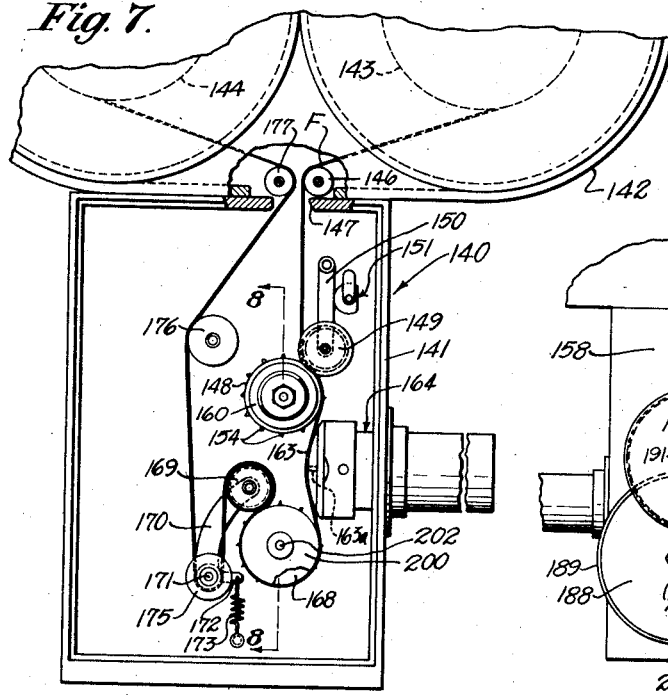
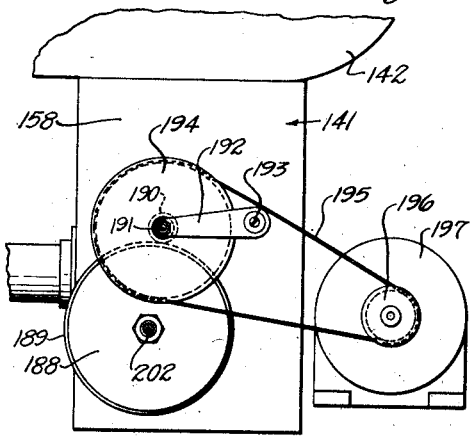
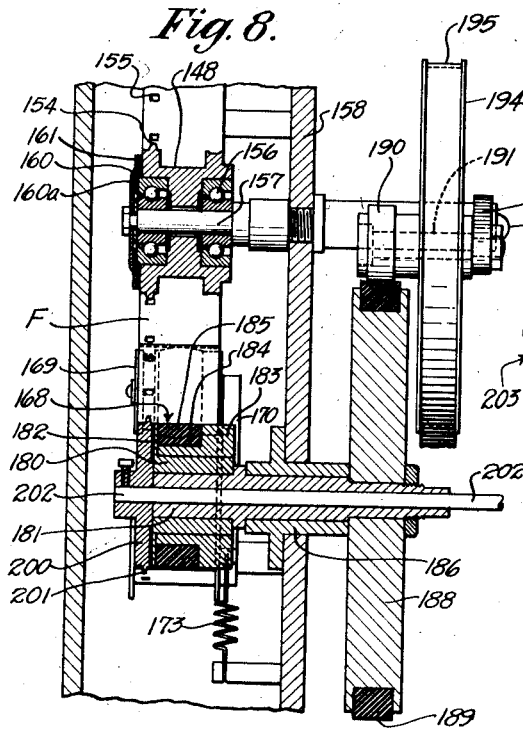
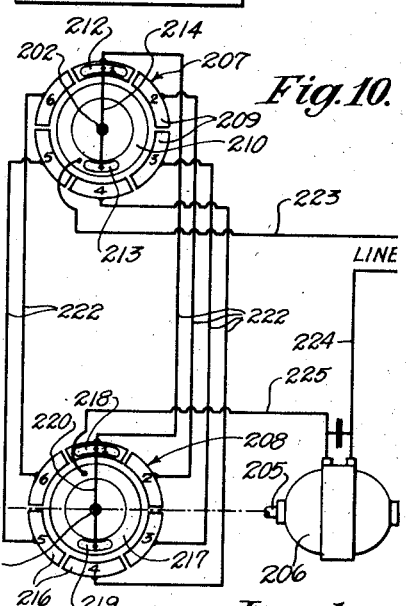
Inventor
Sidney A. Murdock.
Attorney.

Patented May 4, 1937

2,079,223

UNITED STATES PATENT OFFICE 2,079,223

SOUND MOTION PICTURE SYSTEM

Sidney A. Murdock, Los Angeles, Calif., assignor to Robert Gumbiner, Los Angeles, Calif.

Application October 4, 1935, Serial No. 43,513

21 Claims. (Cl. 271—2.6)

This invention relates generally to sound picture apparatus, and more particularly to means for driving a film strip at constant speed for sound wave translation in a recorder or projection apparatus.

For the proper recording and reproducing of sound it is essential that the film be moved past the recording or reproducing light beam with a high degree of steadiness or uniformity of motion, as slight variations in sound record speed are reflected as very noticeable and highly objectionable pitch variations in the reproduced sound.

It is a primary object of the present invention to provide improved and simplified means for moving the sound record film past the sound wave translation point with a high degree of uniformity of speed, both in recording and in reproduction of sound, and to provide improved and simplified means for moving the film in other parts of the recording and reproducing apparatus at a speed synchronized with the rate of travel of the film past the sound wave translation point.

In accordance with the present invention, the film strip is moved past the sound wave translation light beam in the recorder by a smooth film driving drum powered by a constant speed electric motor. The film strip, thus driven by the film drum of the recorder, engages and drives a freely rotatable control sprocket, which in turn controls through electrical means the speed of the electric motor that drives the motion picture camera. Thus the speed of the motion picture camera depends upon the speed of movement of the sound record film in the recorder. In the projector, the film is similarly moved past the sound wave translation light beam by a smooth film driving drum powered by a constant speed electric motor, and the film strip driven by said drum drives a control sprocket that controls the speed of the main electric motor that powers the film advancing sprockets and intermittent mechanism in the picture projection part of the apparatus. Thus while one portion of the film strip is moved at constant speed past the sound wave translation light beam by a constant speed electric motor, another portion of the same film strip is driven through the picture projection part of the apparatus by a different electric motor, which is controlled in speed by a control member driven by the film moving through the sound wave translation part of the apparatus. This latter film driving scheme may also be employed in the event the sound record and picture record are photographed originally on the same film strip, using a camera and sound recorder combined in one mechanical unit, as will be evident.

Various additional objects and features of the invention will appear in the following detailed description of present preferred embodiments thereof, reference for this purpose being had to the accompanying drawings, in which:

Fig. 7 is a view showing a sound unit in accordance with the present invention;

Fig. 8 is a section on line 8—8 of Fig. 7;

Fig. 9 is a back view of the recorder of Fig. 7, the scale being reduced; and

Fig. 10 is a diagrammatic view showing the electrical synchronizing means between the sound recorder of Figs. 7 to 9 and a motion picture camera.

Figure 1:
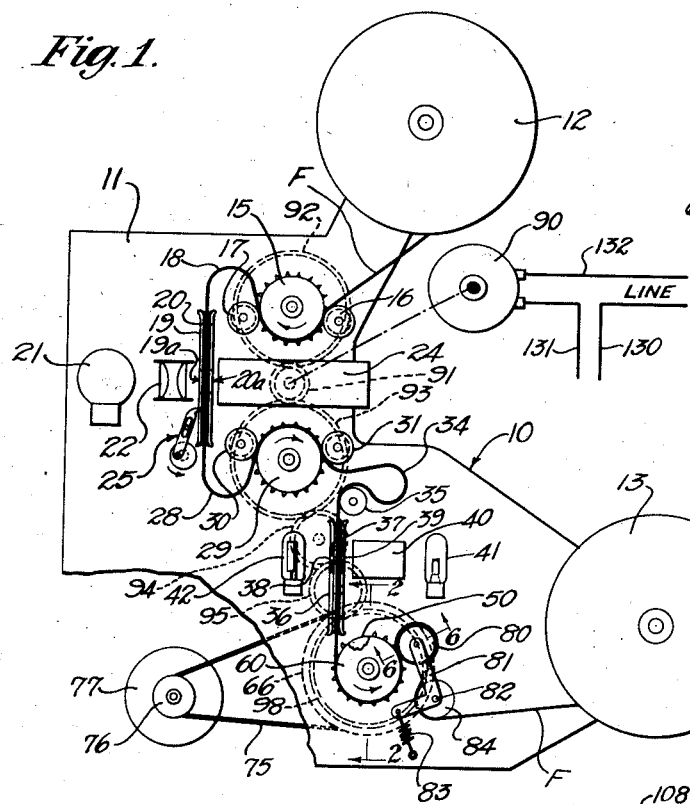
Fig. 1 shows somewhat diagrammatically a motion picture and sound projector equipped with the film driving device of the present invention.

Reference is first directed to Figs. 1 to 5, in which the picture and sound projector is designated generally at 10, being shown as provided with a frame plate 11 supporting film supply reel 12 and film take-up reel 13. The film F coming from supply reel 12 passes around the lower side of a driven sprocket 15, being retained thereon by rolls 16 and 17. Leaving sprocket 15, the film forms a slack loop 18, and then passes downwardly through aperture plates 19 and 20, having picture projection apertures 19a and 20a. A projection lamp is indicated at 21, and the light rays from said lamp are directed by collector lens 22 through aperture 19a onto the film strip, the illuminated film being projected onto the screen through aperture 20a by means of a usual projection lens mounted in lens tube 24. The film is moved past the projection aperture by an intermittent film moving mechanism 25 of any suitable type, this mechanism being geared to the projector drive motor through any suitable driving interconnections, not shown.

From the lower end of aperture plates 19 and 20 the film forms a slack loop 28, and then passes over the upper half of a driven film sprocket 29, being retained thereon by rolls 30 and 31.

Leaving sprocket 29, the film is formed with a slack loop 34, then passes over idler roll 35, and then is drawn downwardly between aperture plates 36 and 37, which are formed with usual sound record light apertures at 38 and 39, respectively. Light is projected onto the sound track area of the film strip through slot 39 by means of a suitable lens within lens tube 40 and an illuminant 41, and the illuminated sound track affects a photo-electric cell 42 mounted opposite aperture 39, in the usual manner.

Figure 6:
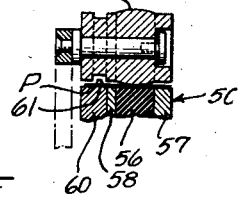
Fig. 6 is a detail section on line 6—6 of Fig. 1.
Figure 5:
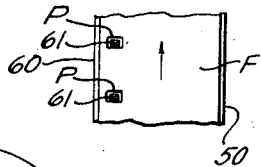
Fig. 5 is a fragmentary view showing a portion of the film strip passing over the film feeding drum.
Figure 3:
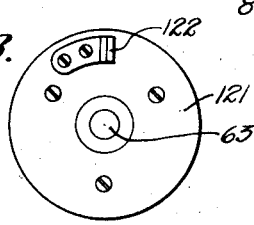
Fig. 3 is a detail elevation of an electric contact and collector ring.
Figure 2:
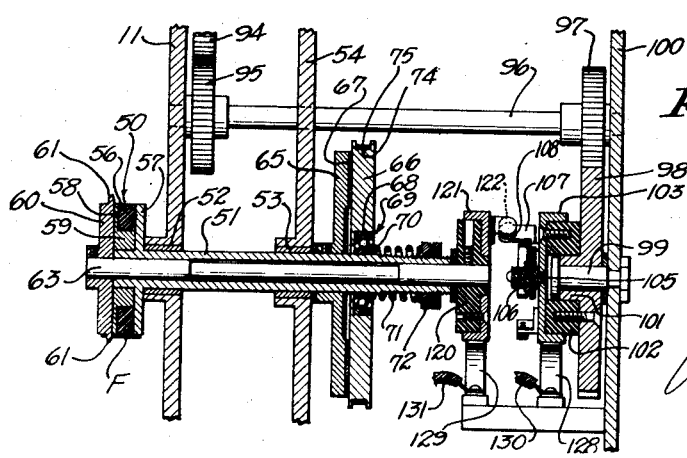
Fig. 2 is a vertical section taken on line 2—2 of Fig. 1.

The film strip is drawn downwardly from between plates 36 and 37 by a film driving drum 50 (see Fig. 2), passing around the lower side of said drum and being pressed against it at the point of separation therefrom by a crowned pressure roll 80 (Fig. 6), which establishes the frictional driving contact between drum 50 and the film, as later to be more fully described. Drum 50 is mounted on the end of a rotatable hollow shaft or sleeve 51, journaled at 52 in projector frame 11, and at 53 in a frame plate 54, as shown in Fig. 2. Film driving drum 50 is provided with a rubber ring 56 confined laterally between a flange 57 mounted on sleeve 51 at a point near its outer end, and the flange 58 of a ring 59 tightly mounted on the end of said sleeve 51, rubber ring 56 seating on mounting ring 59 in the manner illustrated. The film engaging periphery of drum 50 is thus provided with a rubber facing.

The outer surface of mounting ring 59 and its flange 58 is flush with the outer end of sleeve 51. Mounted adjacent said surface is a sprocket wheel 60, formed with sprocket teeth 61 adapted to mesh with the perforations P of the film strip passing over and driven by drum 50. Sprocket wheel 60 is rigidly mounted on a shaft 63 which extends through and is relatively rotatable within the previously mentioned drum drive sleeve 51. It may here be mentioned that the film strip is driven by the rubber faced drum 50, and that sprocket wheel 60, whose sprocket teeth 61 mesh with perforations of the film passing over drum 50, is driven by the film, for a purpose which will appear later. Preferably, sprocket teeth 61 of sprocket 60 do not fit the film perforations tightly, but are somewhat reduced in both dimensions, as clearly indicated in Fig. 5. In the present preferred driving arrangement for film drum 50, there is rigidly mounted on hollow drum shaft or sleeve 51 a friction disk 65, against which is yieldingly pressed a belt driven friction disk 66 which is rotatably mounted on sleeve 51. A felt washer or facing 67 is shown on the surface of disk 65 and is engaged by driving disk 66, this felt facing providing proper driving engagement between the two disks. Disk 66 is shown mounted on the outer race ring 68 of a ball bearing assembly 69, the inner ring 70 of which is slidably mounted on sleeve 51. A coil spring 71 encircling sleeve 51 bears against inner bearing ring 70 to press said bearing and friction disk 66 carried thereby into yielding frictional engagement with disk 65, the other end of spring 71 seating against a nut 72 screwthreaded on the sleeve 51, as shown. The periphery of disk 66 is provided with a belt groove 74, which receives a drive belt 75 driven from pulley 76 of a constant speed electric motor 77.

Motor 77 thus drives sleeve 51 and rubber faced film driving drum 50 through a yielding frictional drive connection or clutch constituted by friction disks 65 and 66 and their engaging spring 71. These friction disks will slide on one another in the event that sleeve 51 and drum 50 should for any reason be prevented from rotating, as by reason of failure of the film feed ahead of drum 50.

Leaving drum 50, the film passes around pressure roll 80, which is on an arm 81 pivoted at 82 and acted upon by a spring 83 pressing roll 80 tightly against the film on drum 50. The film passes from roller 80 under and around a roll 84 concentric with arm pivot 82, and then goes to the take-up reel 13, which may be driven in any usual manner, not shown.

The pressure of roll 80 against the film on drum 50 is sufficient to assure driving of the film by said drum. It will be evident that tension in the film leaving roll 80 and passing around roll 84, for instance exerted by operation of take-up reel 13, will cause a force to be exerted on roll 80 in such a direction as to press the film more tightly against driving drum 50.

Thus it will be evident that the film is drawn downwardly past sound wave translation aperture 38, 39 by film drum 50, which is driven by constant speed motor 77, pressure roll 80 pressing the film against the surface of drum 50 to give the necessary driving adhesion between the drum and film.

The film advancing devices in the picture projection portion of the apparatus are operated by a separate source of power which is under the control of the described sprocket wheel 60 which is rotated by the film passing over film driving drum 50. A projector drive motor 90 is diagrammatically indicated in Fig. 1 as drivingly coupled to a gear 91, which meshes with and drives two gears 92 and 93 driving projector film sprockets 15 and 29, respectively. Meshing with and driven by gear 93 is an idler gear 94, in mesh with an idler gear 95. Gear 95 is on a shaft 96 (see Fig. 2), which carries a gear 97 meshing with a gear 98 which is concentric with and disposed just rearward of the inner end of shaft 63 that carries film driven sprocket 60. Gear 98 is mounted for rotation on a shaft 99 supported by frame member 100. The hub 101 of gear 98 carries an insulation ring 102, over which is fitted an electrically conductive cup-shaped collector ring member 103. This member 103 is supported by ring 102 out of electrical contact with gear 98 and its supporting shaft 99.

Figure 4:
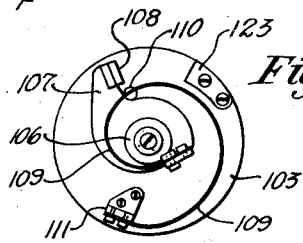
Fig. 4 is a detail elevation of another electric contact and collector ring.

Mounted in the center of member 103 is a stud 105, on which is rotatably mounted the hub 106 of a contact arm 107 carrying an outwardly projecting electrical contact 108 (Figs. 2 and 4). Connected between contact arm 107 and ring 103 is a coil spring 109, which urges contact arm 107 to rotate in a clockwise direction, the device being viewed as in Fig. 4. This spring presses arm 107 against a stop pin 110 set into ring 103. Arm 107 is capable of being rotated in a counter-clockwise direction from the limiting position established by stop 110 until it engages the mounting member 111 for the outer end of coil spring 109. Contact arm 107 is thus capable of a certain limited rotation with reference to annular member 103, but stands normally, under the influence of spring 109, against stop pin 110.

Rigidly mounted on the inner end of sprocket shaft 63 is an insulation ring 120, which carries an electrically conductive collector ring member 121 on which is an electrical contact 122 adapted to engage and electrically coact with the previously described electrical contact 108. Contact 122 is taken between contact 108 and an insulated or insulation stop 123 mounted on member 103 a distance back of contact 122 as shown. This insulation stop 123 prevents contact 122 from coming into electrical contact with spring 109. Rotation of shaft 63 in proper direction brings contact 122 against contact 108, and so forms an electrical circuit from electrically conductive ring 122 through said contacts and through contact arm 107 and stud 105 to electrically conductive ring 103. As contact 122 first engages contact 108 on arm 107, said arm will be moved from its limiting position against stop pin 110 a certain distance toward stop 111, spring 109 yielding accordingly; but when normal running conditions are established, arm 107 is returned by spring 109 to its position at stop pin 110, possibly leaving said pin a very slight distance as it is intermittently engaged by contact 122, as further to be explained later.

Brushes 128 and 129 bear on electrically conductive rings 103 and 121, respectively. Connected to these brushes 128 and 129 are electrical leads 130 and 131, lead 130 being connected to one side of the power line supplying current to projector motor 90, and lead 131 being connected directly to one side of motor 90. The other side of projector motor 90 is connected by lead 132 to the other side of the line, as indicated in Fig. 1.

Operation of the film driving system is as follows: The film advancing sprockets 15 and 29 and intermittent mechanism 25 of the projector are positively driven as previously described from projector motor 90, and operate to draw the film downwardly from supply reel 12, moving it intermittently past the picture projection aperture, and feeding it downwardly to form loop 34. The film is drawn downwardly from loop 34 past sound wave translation aperture 38, 39 by film driving drum 50, against which the film is firmly pressed by pressure roll 80, driving drum 50 being driven through the described friction slip clutch from constant speed motor 77. The film leaving film driving drum 80 passes around rolls 80 and 84 and is finally taken up by take-up reel 13, driven in any conventional manner. The film passing around film driving drum 50 is so positioned that its perforations engage the teeth 61 of sprocket wheel 60, which is concentric with and adjacent to film drum 50, the film acting to rotate said sprocket in exact accordance with its own speed of travel. Thus, while there may be some slight slippage between the film strip and its driving drum 50, engagement between the film and the sprocket 60 is of a positive nature, and the speed of rotation of sprocket 60 accordingly becomes an exact measure of the speed of travel of the film strip as driven by drum 50.

Sprocket 60 thus driven by the film strip causes corresponding rotation of its shaft 63 and the electrical contact 122 carried thereby. In so rotating with shaft 63, contact 122 comes against and makes electrical contact with the contact 108 carried by and rotatable with the previously described gear 98, which is driven from projector motor 90. Now projector motor 90 is energized and drives ahead only when contacts 122 and 108 are in such engagement with one another, said contacts being in series with leads 130 and 131 which make up one side of the line feeding said motor. Motor 90 is designed to have a slight over-drive tendency; that is, motor 90 tends when energized to drive gear 98 and electrical contact 108 carried thereby at a speed of rotation slightly greater than that of film driven sprocket 60, shaft 63, and electrical contact 122 carried thereby. Accordingly, assuming shaft 63 and contact 122 to be rotating at normal speed, and to be just in contact with electrical contact 108, the speed of motor 90 is such that contact 108 tends to get slightly ahead of contact 122, thus breaking the energizing circuit of motor 90. When this occurs, that part of the projector mechanism driven by motor 90, including contact 108, slows down slightly until electrical contact is re-established between contacts 108 and 122, whereupon motor 90 is again energized and again slightly increases its speed, again causing contact 108 to separate from contact 122, thus again opening the motor circuit, and so on. This cycle of operations is of continuous recurrence, the energizing circuit of motor 90 being opened and closed many times per second, and the result is that motor 90 and the film driving parts of the projector driven thereby are caused to move at such a speed, or within such range of speeds, as to maintain a close synchronous relation with the speed of the film as driven by film driving drum 50 operated by separate constant speed motor 77. The fact that minor irregularities of speed occur in the drive of the film past the picture projection parts of the apparatus is immaterial, as such speed fluctuations as occur cannot be detected in the projected picture and have no effect whatsoever on its quality. Movement of the film past the sound wave translation aperture by film drum 50 driven by motor 77 is, however, perfectly uniform, all sprocket teeth and gearing between said motor and the point of the film drive having been avoided. The sprocket wheel 60 has no effect on the speed of travel or the uniformity of movement of the film as driven by drum 50, being freely rotatable with reference to drum 50 and being simply driven by the film as a measure of its speed as the film is uniformly advanced by driving drum 50. Attention is directed to the fact that while there may be some very slight slippage or creepage between film drum 50 and the film strip driven thereby, such slippage or creepage may be entirely disregarded. Any such slippage as does occur in this manner has no effect on the quality of sound reproduction, since it is constant in amount at all times and therefore causes no speed irregularities at the sound aperture. And any such creepage has no effect on the synchronization of the system, since motor 90 is synchronized with the actual speed imparted to the film by drum 50 rather than directly with drum 50.

When the apparatus is at rest, electrical contact 122 is located at some position between electrical contact 108 and insulation stop 103, and may or may not be in contact with contact 108. To start the apparatus, the starting switches (not shown) for motors 77 and 90 are closed simultaneously. If contacts 108 and 122 were initially together, both motors would then be energized and would start to rotate together. If the contacts were not initially together, motor 77 would start first and thus bring the contacts together, whereupon motor 90 would be energized and would start to rotate. Both motors thus being in operation, motor 90, which as previously explained is designed to have a slight over-drive tendency, acts to move contact 108 ahead of contact 122, thus breaking its own energizing circuit. If motor 77 has a tendency to pick up quickly, such separation of contacts 108 and 122 may not occur until after full running conditions have been established. If motor 90 tends to pick up more quickly than does motor 77, on the other hand, the apparatus will come up to speed by a series of intermittent energizations of motor 90 as contacts are made between contacts 108 and 122. Full running conditions having been established, operation is as previously described.

Figs. 7 to 10 show a typical adaptation of the present invention to a sound recorder and mechanically separate motion picture camera. The recorder is indicated at 140, and is shown provided with a casing 141 supporting magazine 142 containing the feed and take-up film rolls 143 and 144, respectively. The film and take-up rolls are mounted on reels, not shown, the take-up reel for film roll 144 being provided with any suitable or well known take-up drive means, not necessary here to illustrate.

The film F coming from feed roll 143 passes downwardly from magazine 142 over idler roll 146, entering recorder case 141 through aperture 147 and passing downwardly over one side of friction hold-back sprocket 148, against which it is retained by retaining roll 149. Roll 149 is here shown as mounted on pivoted arm 150 and held in position adjacent roller 148 by locking device 151 releasably engaging arm 150.

Sprocket 148, which is provided with sprocket teeth 154 adapted to engage the perforations 155 of the film strip, is mounted for rotation on bearings 156 supported by shaft 157 mounted on casing wall 158. A uniform frictional drag is imposed on sprocket 148 through the medium of a dished spring plate or washer plate 160 mounted on the outer end of sprocket shaft 157 and provided with a felt washer 160a bearing against the side surface 161 of the sprocket, as clearly shown in Fig. 8. Sprocket 148 thus exerts a uniform yielding hold-back tendency on the film strip, which is not, however, so great as to place undue strain on the film.

Leaving sprocket 148, the film, in the present form of the device, passes over an arcuate plate or skid 163, which defines the inner end of the optical recording unit, generally indicated by numeral 164. This plate 163 has the usual recording aperture 163a. Recording unit 164 may of course be of any usual or approved type, and need not here be detailed.

Leaving skid 163, the film strip passes downwardly under and around a smooth film driving drum 168, similar to the film driving drum 150 of the device of Fig. 1, the film being pressed into driving engagement with said drum 168 at its point of separation therefrom by a crowned pressure roll 169 on pivoted arm 170. Arm 170 is here shown as pivoted at 171 and as provided with an arm 172 acted upon by a spring 173 in such direction as to press roll 169 against drum 168.

The film leaving drum 168 passes around pressure roll 169, then passes downwardly and under an idler roll 175 concentric with arm pivot 171, then rises and passes over idler 176, and leaves the recorder case through aperture 147 to reenter the magazine, wherein it passes over roll 177 to be taken up by the take-up reel. As mentioned above, the film is pressed into driving engagement with smooth film driving drum 168 by pressural engagement of pressure roll 169, while the frictionally held-back film sprocket 160 placed ahead of drum 168 and the sound aperture produces a certain tension in the film between sprocket 160 and pressure roll 169, thereby improving the driving adhesion between drum 168 and the film, and also steadying the film in moving past sound aperture 163a.

Film driving drum 168 is here shown as made up of a sleeve member 180 rigidly mounted on the end of drum drive shaft 181, and provided with an outwardly extending annular flange 182 defining the outer side surface of the drum. Mounted on sleeve 180 is an annular member 183 cut as at 184 to receive a rubber ring 185, the peripheral surface of which is adapted for driving engagement with the film strip.

Drum shaft 181 is mounted for rotation in a bearing 186 mounted in casing wall 158, and, in the present illustrative embodiment, has rigidly mounted on its rearward end a friction disk 188 of a frictional driving train (see Figs. 8 and 9). As here shown, the periphery of disk 188 is provided with a rubber ring 189, which is drivingly engaged by a small friction wheel 190, the latter being mounted on a shaft 191 mounted for rotation in the swinging end of pivoted arm 192. Shaft 191 also carries a belt pulley 194, which is drivingly connected through belt 195 with a belt pulley 196 on the shaft of a constant speed electric motor 197. The pivot point 193 of arm 192 is so located with reference to the direction of pull of belt 195 that arm 192 and friction wheel 190 are caused to be pressed into tight frictional engagement with the periphery of friction disk 188 by virtue of tension in the belt. Such a driving means as is here illustrated and described was first disclosed in my copending application entitled Film driving system, filed Jan. 2, 1935, Ser. No. 94, and is preferred for the reason that it avoids the use of gears between the driving motor and the film driving sprocket, which inevitably introduce speed irregularities. With a friction drive means such as here described, the film driving drum 168 is driven by motor 197 with a high degree of uniformity of speed. Some slight creepage may occur in the frictional driving train between electric motor and the final film engaging drum, but any such creepage is constant in amount at all times and has no effect on the quality of the sound record.

Mounted adjacent the flat outer surface of film driving drum 168 is a sprocket wheel 200, formed with sprocket teeth 201 adapted to mesh with the perforations of the film strip passing over and driven by drum 168. Sprocket wheel 200 is rigidly mounted on a shaft 202 which extends through and is relatively rotatable within the previously described hollow drum drive shaft 181. As in the device of Fig. 1, sprocket 200 and its shaft 202 are rotated by the film, and constitute a measure of the speed of the film as advanced by film driving drum 185. The rotation of shaft 202 is, as in the device of Fig. 1, utilized to control the speed of drive of other film advancing devices. For instance, assuming the recorder to be operated in synchronism with a motion picture camera, the camera speed is controlled, in accordance with the present invention, by rotation of this film driven sprocket shaft 202. Such control may be effected in various ways. For instance, if the recorder and picture camera are incorporated in one mechanical unit, such an arrangement as described in Figs. 1 to 6 may be employed, the rotating electrical contacts driven respectively by the film driven sprocket shaft and by the camera mechanism being included in the circuit which energizes the camera motor. When, however, the picture camera is a unit physically separate of the recorder, electrical synchronization means are employed.

A preferred means for controlling the speed of a physically separate motion picture camera in accordance with rotation of sprocket shaft 202 is diagrammatically indicated in Fig. 10. In said figure, the shaft 202 driven by film driven sprocket 200 is again indicated by numeral 202. The intermittent film pull-down mechanism of the camera is diagrammatically indicated at 203, as is indicated as driven through gearing arrangements at 204 from the shaft 205 of electric motor 206. The camera mechanism is thus powered by its own motor.

Two synchronizing commutator sets 207 and 208 are provided, the first being associated with the sound recorder unit and the second with the camera. Unit 207 comprises a plurality of circularly arranged commutator segment elements 209, shown as six in number, arranged concentrically with reference to control shaft 202. Concentric with segments 209 is a conductive collector ring 210. A rotating brush system is provided, including a brush 212 driven by control shaft 202 and adapted to wipe over commutator segments 209, and another brush 213 also driven by shaft 202 which makes with collector ring 210. These brushes are connected by an electrical conductor, as indicated at 214. The camera commutator set is similar, comprising commutator segments 216, collector ring 217, and a rotatable brush system comprising a brush 218 sweeping over the commutator segments and a brush 219 in contact with the collector ring, brushes 218 and 219 being electrically connected by a conductor 220, and being rotated by motor driven camera shaft 205.

The commutator segments of each set being numbered from I to 6, correspondingly numbered segments are interconnected by circuit wires 222. The brush system of each commutator makes connection between the collector ring and one or more of the commutator segments. One side of the line is connected by lead 223 directly to collector ring 210 of the sound unit. The other side of the line is connected by leads 224 to one side of camera motor 206, and the other side of motor 206 is connected by a lead 225 to the collector ring 217 of the camera unit. Assuming that the brush systems of the two commutators are in such position that the segment contacting brushes 212 and 218 are in contact with their respective number I commutator segments, there is a circuit formed from one side of the line through lead 223 to collector ring 210, and thence through brushes 213 and 212 to segment number I of commutator set 207, from said segment number I to connecting wire 222 to segment number I of the camera commutator set 208, thence through brushes 218 and 219 to collector ring 217, thence by way of lead 225 to camera motor 206, and from the other side of said motor by way of lead 224 to the other side of the line. With the parts in this position, current will be supplied to motor 206 which causes it to run ahead, and if the brush system of the sound unit commutator set 207 is stationary, motor 206 will run ahead just far enough to carry brush 218 off segment I and onto segment 2, when the motor circuit will be broken and the motor stopped. If, however, the brush system of the sound unit commutator is also in motion, brush 212 will arrive at its commutator segment 2 at about the same time that camera unit brush 218 arrives at its corresponding segments 2, so that the motor circuit is then closed through those segments. It will be readily understood how the motor circuit is thus kept closed continuously so long as the two brush systems rotate in unison.

Camera motor 206 is thus energized when the brush system of the sound unit commutator is rotated, through successive pairs of commutator segments 1, 2, 3, etc., its energizing current being interrupted whenever it tends to run ahead. In order to prevent motor 206 and the camera unit brush system from lagging behind, motor 206 is preferably so designed as to have a constant tendency to run ahead; and, having this tendency, and its current being interrupted whenever it does actually get ahead, there is positive assurance that the camera motor 206 will run in synchronism with operation of the sound unit sprocket shaft 202 which drives the rotating brush system of the sound unit commutator.

It will now be evident that the film driving system of Figs. 7 to 10 is fundamentally similar to that of the projection apparatus of Figs. 1 to 6. In both instances, the film strip is moved past the sound wave translation point by a smooth film driving drum powered by a separate constant speed electric motor, the film being pressed into driving engagement with said drum by a pressure roller. In both instances, a film driven sprocket is employed, placed preferably concentrically with reference to the film driving drum, and functions as a measure of the speed of the film as driven by the driving drum, and as a means for controlling the speed of operation of other separately powered film advancing film devices. In the instance of Figs. 1 to 6, these other film advancing devices are within the same mechanical unit, operating on different portions of the same film strip that is being driven by the "sound" drum. In the instance of Figs. 7 to 10, these other film advancing devices are in a separate mechanical unit, i. e., within a motion picture camera, and operate on a separate film strip which is to be driven in synchronous relation with the speed of the sound film as driven by the "sound" drum. It will be evident, however, that insofar as the present broad invention is concerned, the situations are fundamentally similar.

Reference is here made to my copending application entitled Film driving system, Serial No. 94, filed January 2, 1935, in which all inventive subject matter common to that case and the instant case is generically claimed.

The invention now described may obviously be carried into effect with the use of various forms of modified apparatus, and is therefore not to be limited except as defined in the appended claims.

I claim:

1. In combination, a film feeding drum adapted to move a film strip past a sound wave translation member, a constant speed electric motor drivingly coupled to said film feeding drum, other film feeding means, an electric motor for operating said film feeding means, and means including a rotatable control member driven by the film as it passes over the film feeding drum for controlling the speed of the second mentioned motor to drive said film feeding means in synchronous relation with the speed of the film as driven by the film feeding drum.

2. In combination, a film feeding drum adapted to move a film strip past a sound wave translation member, a constant speed electric motor drivingly coupled to said film feeding drum, other film feeding means, an electric motor for operating said film feeding means, and means including a control member driven by the sound record film strip at the speed at which the film strip is driven by said film feeding drum for controlling the speed of the second mentioned motor to drive said film feeding means in synchronous relation with the speed of the film as driven by the film feeding drum.

3. In combination, a film feeding drum adapted to move a film strip past a sound wave translation member, a constant speed electric motor drivingly coupled to said film feeding drum, other film feeding means, an electric motor for operating said film feeding means, and means including a rotatable film sprocket driven by the film strip as it passes over the film feeding drum for controlling the speed of the second mentioned motor to drive said film feeding means in synchronous relation with the speed of the film as driven by the film feeding drum.

4. In combination, a film feeding drum adapted to move a film strip past a sound wave translation member, a constant speed electric motor drivingly coupled to said film feeding drum, other film feeding means, an electric motor for operating said film feeding means, and means including a rotatable film sprocket driven by the film strip and located in proximity to the film feeding drum for controlling the speed of the second mentioned motor to drive said film feeding means in synchronous relation with the speed of the film as driven by the film feeding drum.

5. In combination, a film feeding drum adapted to move a film strip past a sound wave translation member, a constant speed electric motor drivingly coupled to said film feeding drum, other film feeding means, an electric motor for operating said film feeding means, and means for controlling the speed of the second mentioned motor to drive said film feeding means in synchronous relation with the speed of the film feeding drum, said means including a control film sprocket concentric to the film drum and relatively rotatable with reference thereto, said sprocket being adapted to be driven by a film strip passing over the film drum.

6. In combination, a film feeding drum adapted to move a film strip past a sound wave translation member, a constant speed electric motor drivingly coupled to said film feeding drum, other film feeding means, variable speed drive means for said film feeding means, and means for controlling the speed of said means to operate said film feeding means in synchronous relation with the speed of the film strip as driven by the film feeding drum, said means including a control film sprocket concentric to the film drum and relatively rotatable with reference thereto, said sprocket being adapted to be driven by a film strip passing over the film drum.

7. In combination, a film feeding drum adapted to move a film strip past a sound wave translation member, a constant speed electric motor drivingly coupled to said film feeding drum, a film sprocket concentric to and adjacent the end of said film feeding drum, said sprocket being adapted to be driven by the film strip passing over and driven by said drum, another film feeding means, variable speed drive means for said film feeding means, and means controlled by said film sprocket for controlling the speed of said drive means to operate said film feeding means in synchronous relation with the speed of the film strip as driven by the film feeding drum.

8. In combination, a film feeding drum adapted to move a film strip past a sound wave translation member, a constant speed electric motor drivingly coupled to said film feeding drum, a film sprocket concentric to and adjacent the end of said film feeding drum, said sprocket being adapted to be driven by the film strip passing over and driven by said drum, another film feeding means, an electric motor drivingly coupled to said film feeding means, and means controlled by the speed of rotation of said film sprocket for controlling the speed of said last mentioned electric motor to drive said film feeding means in synchronous relation with the speed of the film as driven by the film feeding drum.

9. In combination, a film feeding drum adapted to move a film strip past a sound wave translation member, a constant speed electric motor drivingly coupled to said film feeding drum, a film sprocket concentric to and adjacent the end of said film feeding drum, said sprocket being adapted to be driven by the film strip passing over and driven by said drum, another film feeding means, an electric motor drivingly coupled to said film feeding means, an electrical speed control circuit for said motor adapted to cause the motor to drive ahead at increasing speed when closed and to slow down when opened, a pair of electrical contacts in said circuit adapted to effect opening and closing thereof, a rotatable member driven by said film sprocket carrying one of said contacts, and a rotatable member driven by the last mentioned electric motor carrying the other of said contacts, the first mentioned contact being adapted to engage the second mentioned contact when the film sprocket is rotated, thereby closing the speed control circuit of the motor to increase its speed.

10. In combination, a film feeding drum adapted to move a film strip past a sound wave translation member, a constant speed electric motor drivingly coupled to said film feeding drum, a film sprocket concentric to and adjacent the end of said film feeding drum, said sprocket being adapted to be driven by the film strip passing over and driven by said drum, another film feeding means, an electric motor drivingly coupled to said film feeding means, an electrical energizing circuit for said motor adapted to cause the motor to drive ahead at increasing speed when closed and to slow down when opened, a pair of electrical contacts in said circuit adapted to effect opening and closing thereof, a rotatable member driven by said film sprocket carrying one of said contacts, and a rotatable member driven by the last mentioned electric motor carrying the other of said contacts, the first mentioned contact being adapted to engage the second mentioned contact when the film sprocket is rotated, thereby closing the energizing circuit of the motor.

11. In combination, a film feeding drum adapted to move a film strip past a sound wave translation member, a constant speed electric motor drivingly coupled to said film feeding drum, a rotatable sprocket driven by the film strip near the film feeding drum, an electric motor drivingly coupled to said film feeding means, an electrical speed control circuit for said motor adapted to cause the motor to drive ahead at increasing speed when closed and to slow down when opened, a pair of electrical contacts in said circuit adapted to effect opening and closing thereof, a rotatable member driven by said film sprocket carrying one of said contacts, and a rotatable member driven by the last mentioned electric motor carrying the other of said contacts, the first mentioned contact being adapted to engage the second mentioned contact when the film sprocket is rotated, thereby closing the speed control circuit of the motor to increase its speed.

12. In combination, a film feeding drum adapted to move a film strip past a sound wave translation member, a constant speed electric motor drivingly coupled to said film feeding drum, a rotatable sprocket driven by the film strip near the film feeding drum, an electric motor drivingly coupled to said film feeding means, an electrical energizing circuit for said motor adapted to cause the motor to drive ahead at increasing speed when closed and to slow down when opened, a pair of electrical contacts in said circuit adapted to effect opening and closing thereof, a rotatable member driven by said film sprocket carrying one of said contacts, and a rotatable member driven by the last mentioned electric motor carrying the other of said contacts, the first mentioned contact being adapted to engage the second mentioned contact when the film sprocket is rotated, thereby closing the energizing circuit of the motor to increase its speed.

13. In combination, a film feeding drum adapted to move a film strip past a sound wave translation member, a constant speed electric motor drivingly coupled to said film feeding drum, film feeding means for driving another portion of the same film strip, an electric motor for operating said last mentioned film feeding means, and means including a rotatable control member driven by the film as it passes over the film feeding drum for controlling the speed of the second mentioned motor to drive said film feeding means in synchronous relation with the speed of the film as driven by the film feeding drum.

14. In combination, a film feeding drum adapted to move a sound record film strip past a sound wave translation member, a constant speed electric motor drivingly coupled to said film feeding drum, means for feeding a motion picture film, an electric motor for operating said last mentioned means, and means including a rotatable member driven by the sound record film as it passes over the film feeding drum for controlling the speed of the second mentioned electric motor to drive said motion picture film feeding means in synchronous relation with the speed of the sound film as driven by its feeding drum.

15. In combination, a film feeding drum adapted to move a sound record film strip past a sound wave translation member, a constant speed electric motor drivingly coupled to said film feeding drum, means for feeding a motion picture film, an electric motor for operating said last mentioned means, and means including a rotatable member driven by the sound record film as driven by the film feeding drum for controlling the speed of the second mentioned electric motor to drive said motion picture film feeding means in synchronous relation with the speed of the sound film as driven by its feeding drum.

16. In combination, a film feeding drum adapted to move a film strip past a sound wave translation member, a constant speed electric motor drivingly coupled to said film feeding drum, a friction slip clutch between said motor and said film driving drum, other film feeding means for said film strip, an electric motor for operating said other film feeding means, and means for controlling the speed of drive of the film by said other film feeding means and its electric motor in accordance with film driving operation of said film feeding drum.

17. In combination, a film feeding drum adapted to move a film strip past a sound wave translation member, a constant speed electric motor drivingly coupled to said film feeding drum, a friction slip clutch between said motor and said film driving drum, other film feeding means for said film strip, an electric motor for operating said other film feeding means, and means for controlling the speed of drive of the film by said other film feeding means and its electric motor in accordance with the speed of the film as driven by said film feeding drum.

18. In film driving means, the combination of a driven film driving drum around which the film strip is threaded, a pressure roll, a pivoted spring-actuated arm carrying said pressure roll and acting to press it into tight engagement with the film strip on the driving drum, and an idler film roll mounted near the pivot of said pivoted arm, the film strip being wound around said pressure roll and then around said idler roll, all in such manner that tension in the film strip exerted beyond said idler roll causes the pressure roll on the pivoted arm to be pressed more tightly against the driving drum.

19. In film driving means, the combination of a driven film driving drum around which the film strip is threaded, a pressure roll, a pivoted spring-actuated arm carrying said pressure roll and acting to press it into tight engagement with the film strip on the driving drum, and an idler film roll mounted concentrically with the pivot of said pivoted arm, the film strip being wound around said pressure roll and then around said idler roll, all in such manner that tension in the film strip exerted beyond said idler roll causes the pressure roll on the pivoted arm to be pressed more tightly against the driving drum.

20. In combination, a film feeding drum adapted to move a film strip past a sound wave translation member, a constant speed electric motor drivingly coupled to said film feeding drum, a friction slip clutch between said motor and said film driving drum, other film feeding means for said film strip, an electric motor for operating said other film feeding means, and means for controlling the speed of the electric motor for said other film feeding means in accordance with the speed of the film as driven by said film feeding drum.

21. In combination, a film feeding drum adapted to move a film strip past a sound wave translation member, a constant speed electric motor drivingly coupled to said film feeding drum to drive said drum at unvarying constant speed, another film feeding device, variable speed drive means independent of said electric motor for driving said last mentioned film feeding means, and means including a rotatable control member driven by the film strip as driven by the constant speed film feeding drum for controlling said variable speed drive means to operate said film feeding means in synchronous relation with the speed of the film strip as driven by the film feeding drum.

SIDNEY A. MURDOCK.